US009257010B2

(12) United States Patent
Jhanb et al.

(10) Patent No.: US 9,257,010 B2
(45) Date of Patent: Feb. 9, 2016

(54) GAMING SYSTEM AND METHOD FOR ENABLING A PLAYER TO ACCEPT OR REJECT A PROGRESSIVE AWARD

(71) Applicant: IGT, Las Vegas, NV (US)

(72) Inventors: Pratik Jhanb, Henderson, NV (US); Adam J. Thompson, Henderson, NV (US); Clyde A. Ruckle, Las Vegas, NV (US)

(73) Assignee: IGT, Las Vegas, NV (US)

( * ) Notice: Subject to any disclaimer, the term of this patent is extended or adjusted under 35 U.S.C. 154(b) by 204 days.

(21) Appl. No.: 14/026,532

(22) Filed: Sep. 13, 2013

(65) Prior Publication Data

US 2015/0080116 A1 Mar. 19, 2015

(51) Int. Cl.
*A63F 13/00* (2014.01)
*G07F 17/32* (2006.01)

(52) U.S. Cl.
CPC ........ *G07F 17/3258* (2013.01); *G07F 17/3267* (2013.01)

(58) Field of Classification Search
CPC G07F 17/323; G07F 17/3234; G07F 17/3262
USPC .................................. 463/16, 20, 25, 26, 27
See application file for complete search history.

(56) References Cited

U.S. PATENT DOCUMENTS

| | | | | |
|---|---|---|---|---|
| 7,273,415 | B2 * | 9/2007 | Cregan et al. | 463/25 |
| 2002/0142822 | A1 * | 10/2002 | Baerlocher et al. | 463/16 |
| 2003/0036419 | A1 * | 2/2003 | Baerlocher et al. | 463/16 |
| 2005/0054413 | A1 * | 3/2005 | Randall et al. | 463/16 |
| 2008/0108423 | A1 * | 5/2008 | Benbrahim et al. | 463/25 |
| 2009/0111561 | A1 * | 4/2009 | Dewaal et al. | 463/20 |

* cited by examiner

*Primary Examiner* — James S McClellan
(74) *Attorney, Agent, or Firm* — Neal, Gerber & Eisenberg LLP

(57) ABSTRACT

A gaming system which enables a player to exchange progressive awards of corresponding progressive award levels of different multi-level progressive award ("MLP") configurations. Following the gaming system determining a progressive award of a specific progressive award level of a specific MLP configuration, the gaming system enables the player to accept that determined progressive award or forfeit that determined progressive award for another progressive award of a corresponding progressive award level of a different MLP configuration. The gaming system thus enables a player to swap or replace one progressive award of one progressive award level of one MLP configuration for a different progressive award of a corresponding progressive award level of a different MLP configuration. Such a configuration provides an increased level of excitement and enjoyment for certain players because the player's individual decisions regarding which progressive award offers to accept or reject determine which progressive award the player is ultimately provided.

32 Claims, 11 Drawing Sheets

GAMING SYSTEM AND METHOD FOR ENABLING A PLAYER TO ACCEPT OR REJECT A PROGRESSIVE AWARD

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award).

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

One such type of secondary or bonus game is an offer and acceptance game which enables players to accept or decline multiple award offers. One such gaming machine provides the player with a quantity of offers and a final award. When an offer is given, the player may accept or reject the offer. If the player accepts an offer, the player receives the accepted offer amount and the bonus game terminates. If the player declines an offer, the game generates another offer for the player. The player is automatically provided with the last selected offer if the player rejects each of the quantity of previous offers. In this known offer/acceptance game, when the player rejects an offer, the player risks a current or guaranteed award for a higher value award. The game may instead provide a lower award. The game thus creates a risk for the player. Enabling a player to pick from different risk based alternatives and then enabling the player to accumulate awards or offers from the selected alternatives provides excitement and enjoyment to the player. A continuing need exists to provide offer/acceptance games that enable a player to weigh options and explore the consequences of selecting those options where the player may accumulate awards or offers.

Progressive awards associated with gaming machines are also known. In one form, a progressive award is an award amount which includes an initial amount funded by a casino and an additional amount funded through a portion of each wager made on the progressive gaming machines. Typically, the progressive award grows in value as players play the gaming machines and more portions of these players wagers are allocated to the progressive award. When a player obtains a winning symbol or winning symbol combination associated with the progressive award, the accumulated progressive award is provided to the player. After the progressive award is provided to the player, the amount of the next progressive award is reset to the initial value and a portion of each subsequent wager on a gaming machine associated with a progressive award is allocated to the next progressive award.

A progressive award may be associated with or otherwise dedicated to a single or stand-alone gaming machine. Alternatively, a progressive award may be associated with or otherwise dedicated to multiple gaming machines which each contribute a portion of wagers placed at such gaming machine(s) to the progressive award. The multiple gaming machines may be in the same bank of gaming machines, in the same casino or gaming establishment (usually through a local area network ("LAN")) or in two or more different casinos or gaming establishments (usually through a wide area network ("WAN")). Such progressive awards are played for by one or more gaming machines in the same gaming establishment are sometimes called local area progressives ("LAP") and such progressive awards played for by a plurality of gaming machines at a plurality of different gaming establishments are sometimes called wide area progressives ("WAP"). Moreover, a gaming machine or bank of gaming machines may be simultaneously associated with a plurality of progressive awards. In these multi-level progressive award ("MLP") configurations, a plurality of progressive awards start at different progressive award or value levels, such as $10, $100, $1000 and $10,000 and each individually increment or increase until provided to a player. Upon a suitable triggering event at one of more of the gaming machines associated with the MLP, one or more of the progressive awards which form the MLP are provided to one or more of the players at such gaming machines. Similar to gaming machines which employ offer and acceptance games, gaming machines which employ progressive awards provide excitement and enjoyment for players.

A continuing need exists to provide progressive awards to players and specifically to provide progressive awards to players in association with an offer/acceptance game.

SUMMARY

The present disclosure relates generally to gaming systems and methods for enabling a player to accept or reject one or more progressive awards.

In various embodiments, the gaming system disclosed herein enables a player to exchange progressive awards of corresponding progressive award levels of different multi-level progressive award ("MLP") configurations. In these embodiments, following the gaming system determining a progressive award of a specific progressive award level of a specific MLP configuration, the gaming system enables the player to accept that determined progressive award or forfeit that determined progressive award for another progressive award of a corresponding progressive award level of a different MLP configuration. That is, the gaming system of these embodiments enables a player to swap or replace one progressive award of one progressive award level of one MLP configuration for a different progressive award of a corresponding progressive award level of a different MLP configuration. Such a configuration provides an increased level of excitement and enjoyment for certain players because the player's individual decisions regarding which progressive award offers to accept or reject determine which progressive award the player is ultimately provided.

More specifically, in various embodiments, the gaming system maintains a plurality of progressive awards in a plurality of MLP configurations. Each MLP configuration includes a plurality of progressive awards at a plurality of progressive award levels. Each progressive award level of each MLP configuration is associated with or otherwise corresponds to a progressive award level of at least another one of the MLP configurations. That is, the gaming system maintains a plurality of progressive awards wherein each progressive award is associated with or otherwise corresponds to at least another progressive award at a comparable progressive award level. For example, the gaming system maintains three different MLP configurations wherein each MLP configuration includes a first progressive award of a first progressive award level, a second progressive award of a second, different progressive award level and a third progressive award of a third, different progressive award level. In this example, the different progressive awards of the same progressive award level and the different progressive awards of different progressive award levels may have the same value or may have different values.

In these embodiments, upon a progressive award triggering event associated with one of the MLP configurations, the gaming system triggers a progressive award determination sequence. In certain embodiments, a progressive award triggering event occurs independent of any displayed event associated with any plays of any of primary games and/or any plays of any secondary games. In certain other embodiments, a progressive award triggering event occurs in association with a play of a primary game or a play of a secondary game.

In association with the triggered progressive award determination sequence, the gaming system determines one of the progressive awards of the associated MLP configuration. Put differently, the gaming system determines which progressive award of which progressive award level of the associated MLP configuration to offer to the player. For example, if a progressive award triggering event occurs in association with a first maintained MLP configuration, the gaming system initiates a progressive award determination sequence to determine to offer to the player the second progressive award of the second progressive award level of the first maintained MLP configuration.

Following the progressive award determination sequence and the determination of a progressive award level of the MLP configuration associated with the occurrence of the progressive award triggering event, the gaming system enables a player to accept or reject the determined progressive award. If the player accepts the determined progressive award, the gaming system provides the current value of the determined progressive award to the player. In these embodiments, if a player accepts the offered progressive award of an MLP configuration, the player forgoes an opportunity to potentially win a different progressive award of a different MLP configuration. For example, if the gaming system determined to offer to the player the second level progressive award of the first maintained MLP configuration and the player accepted this offer, the gaming system provides the player the progressive award of the second progressive award level of the first maintained MLP configuration.

On the other hand, if the player rejects the determined progressive award, the gaming system triggers a progressive award replacement sequence. The progressive award replacement sequence includes the gaming system selecting another progressive award of another MLP configuration, wherein the selected progressive award of the other progressive award is of a corresponding progressive award level as the progressive award level of the rejected progressive award. Put differently, the gaming system enables the player to forfeit a progressive award of a progressive award level of one MLP configuration for another progressive award of a corresponding progressive award level of another MLP configuration. For example, if the gaming system determined to offer to the player the second level progressive award of the first maintained MLP configuration and the player rejected this offer, the gaming system determines, via a progressive award replacement sequence, to provide the player the progressive award of the second progressive award level of the third maintained MLP configuration.

Such decisions of either accepting a known offer of a progressive award or rejecting a known offer for either winning a higher valued or lower valued progressive award of a comparable progressive award level of another MLP configuration provides an increased level of excitement and enjoyment to players. Moreover, such a configuration of enabling a player to win: (i) a progressive award associated with the gaming machine the player is currently playing at or (ii) a progressive award associated with a gaming machine the player is currently not playing at provides an increased level of anticipation for certain players and thus provides an increased gaming experience for such players.

Additional features and advantages are described herein, and will be apparent from the following Detailed Description and the figures.

DETAILED DESCRIPTION

Offer and Acceptance of Progressive Awards

In various embodiments, the gaming system disclosed herein enables a player to exchange progressive awards of corresponding progressive award levels of different multi-level progressive award ("MLP") configurations. In these embodiments, following the gaming system determining a progressive award of a specific progressive award level of a specific MLP configuration, the gaming system enables the player to accept that determined progressive award or forfeit that determined progressive award for another progressive award of a corresponding progressive award level of a different MLP configuration. That is, the gaming system of these embodiments enables a player to swap or replace one progressive award of one progressive award level of one MLP configuration for a different progressive award of a corresponding progressive award level of a different MLP configuration. Such a configuration provides an increased level of excitement and enjoyment for certain players because the player's individual decisions regarding which progressive award offers to accept or reject determine which progressive award the player is ultimately provided.

While certain of the embodiments described below are directed to winning a progressive award in association with a primary or base game, it should be appreciated that the present disclosure may additionally or alternatively be employed in association with winning a progressive award in association with a secondary or bonus game. Moreover, while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

Figure 1:
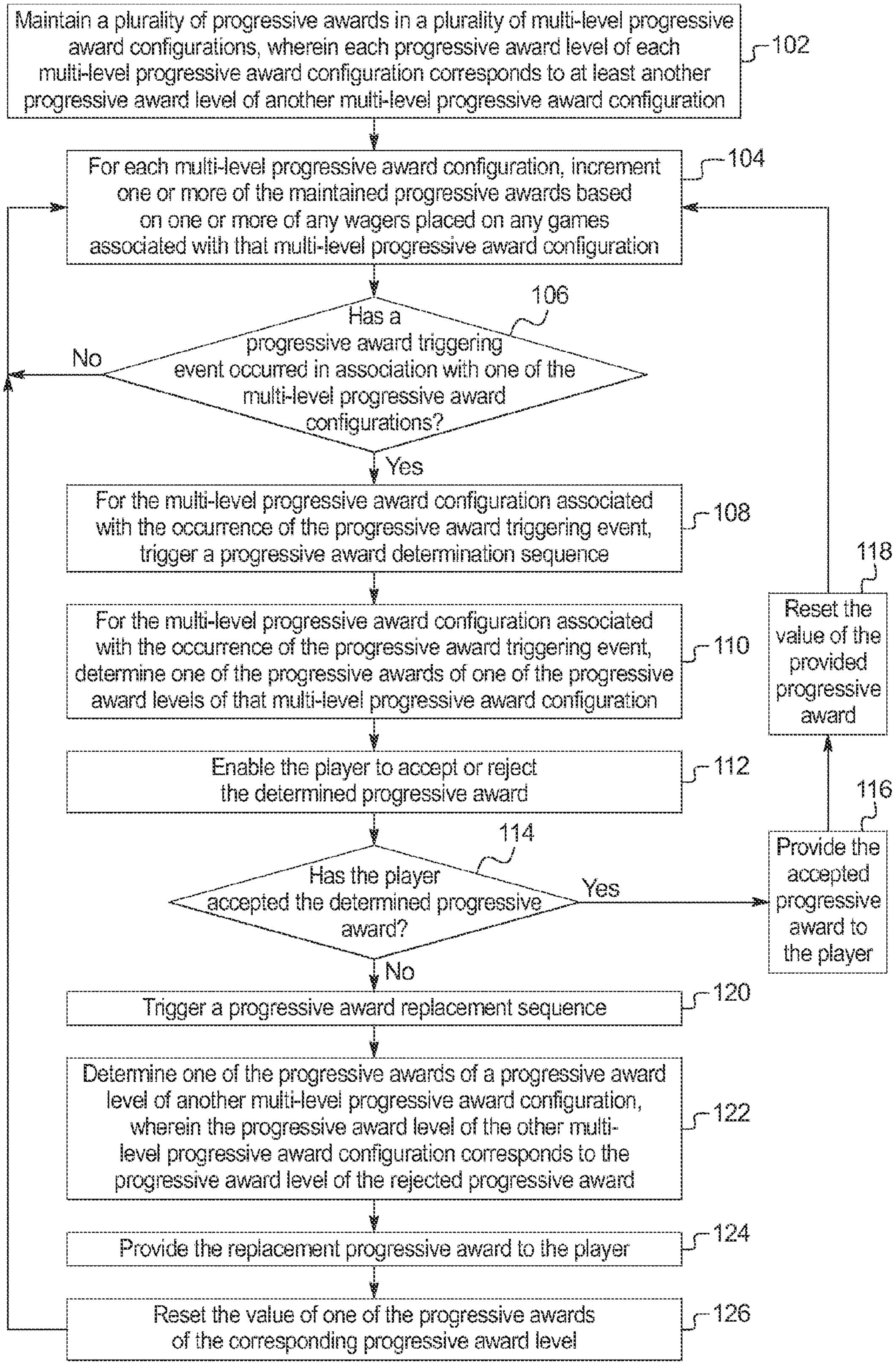
FIG. 1 is a flow chart an example process for operating a gaming system including enabling a player to reject one progressive award of one progressive award level of one MLP configuration for another progressive award of a corresponding progressive award level of another MLP configuration as disclosed herein.

Referring now to FIG. 1, a flowchart of an example embodiment of a process for operating a gaming system disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In various embodiments, the gaming system maintains a plurality of progressive awards in a plurality of multi-level progressive award ("MLP") configurations as indicated in block 102 of FIG. 1. In one such embodiment, a plurality of electronic gaming machines ("EGMs") at one or more gaming sites are networked to the central server in a progressive configuration with the plurality of maintained progressive awards. In another such embodiment, a single or stand-alone EGM is associated with or otherwise dedicated to the plurality of maintained progressive awards. In another such embodiment, one or more Internet accessible dedicated gaming sites are associated with the maintained progressive awards.

Each MLP configuration includes a plurality of progressive awards of a plurality of progressive award levels. In these embodiments, as further indicated in block 102, each progressive award level of each MLP configuration is associated with or otherwise corresponds to at least another progressive award level of another MLP configuration.

Figure 2A:
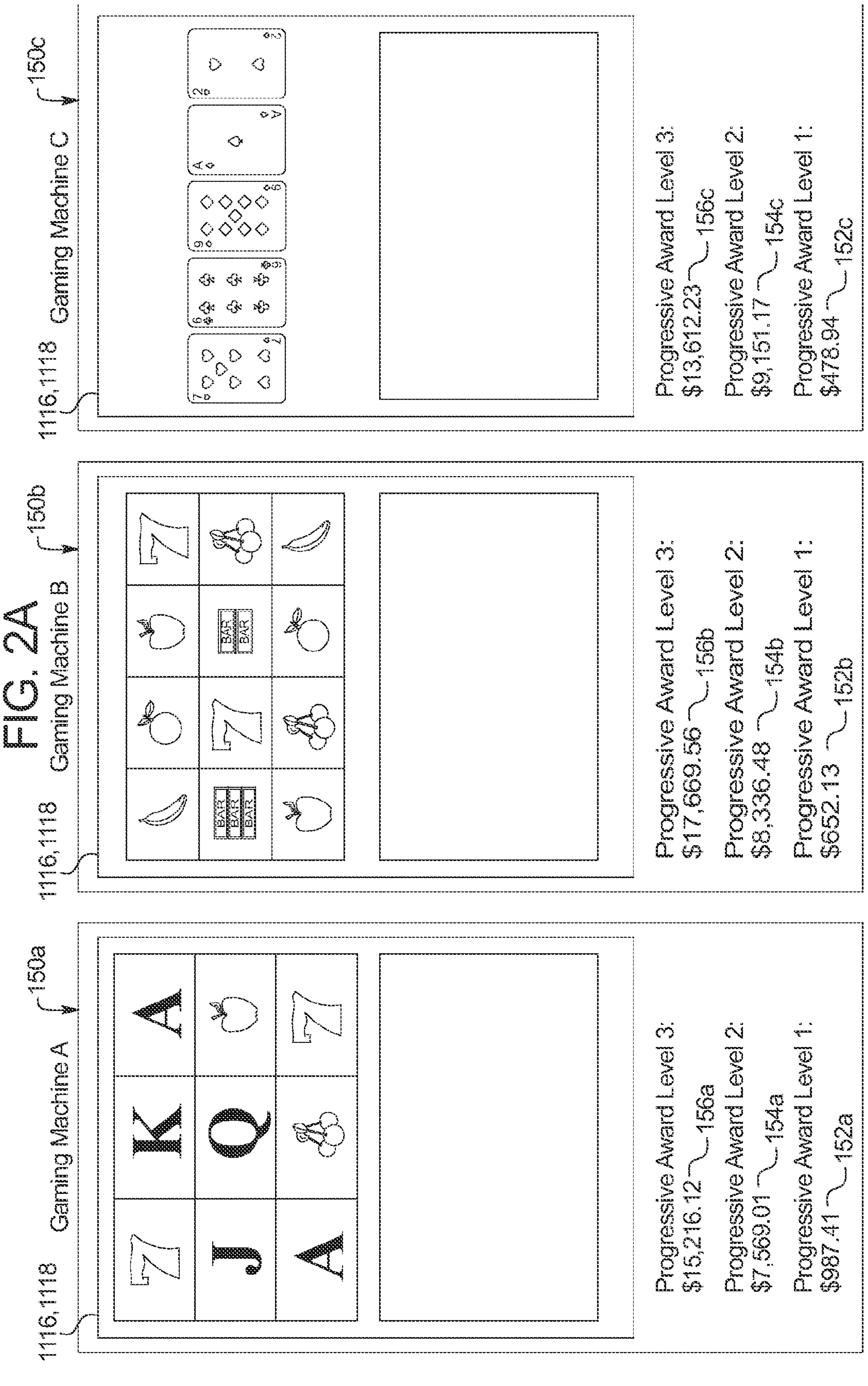
FIGS. 2A, 2B, 2C, 2D, 2E and 2F are front views of one embodiment of the gaming system disclosed herein illustrating a progressive award determination sequence and a progressive award replacement sequence.

For example as seen in FIG. 2A, the gaming system maintains three MLP configurations wherein each MLP configuration includes at least three associated or corresponding progressive award levels. Specifically, for a first EGM 150*a* (illustrated as "Gaming Machine A"), the gaming system maintains: (i) a first progressive award of a first progressive award level 152*a*, (ii) a second progressive award of a second progressive award level 154*a* and (iii) a third progressive award of a third progressive award level 156*a*. For a second EGM 150*b* (illustrated as "Gaming Machine B"), the gaming system maintains: (i) a first progressive award of a first progressive award level 152*b*, (ii) a second progressive award of a second progressive award level 154*b* and (iii) a third progressive award of a third progressive award level 156*b*. For a third EGM 150*c* (illustrated as "Gaming Machine C"), the gaming system maintains: (i) a first progressive award of a first progressive award level 152*c*, (ii) a second progressive award of a second progressive award level 154*c*, (iii) a third progressive award of a third progressive award level 156*c*. In this example: (i) the first progressive award levels of each EGM are associated with each other or are otherwise corresponding progressive award levels (i.e., the three first level progressive awards are associated with each other), (ii) the second progressive award levels of each EGM are associated with each other or are otherwise corresponding progressive award levels (i.e., the three second level progressive awards are associated with each other), and (iii) the third progressive award levels of each EGM are associated with each other or are otherwise corresponding progressive award levels (i.e., the three third level progressive awards are associated with each other).

It should be appreciated that in one embodiment, one or more progressive awards of one or more progressive award levels are associated with one or more progressive awards of different progressive award levels of one or more other MLP configurations. For example, a second progressive award of a second progressive award level of one MLP configuration is associated with or otherwise corresponds to a third progressive award of a third progressive award level of another MLP configuration. It should be further appreciated that one or more maintained MLP configurations may include one or more progressive awards of one or more progressive award levels not associated with any corresponding progressive award levels of any other maintained MLP configurations. For example, if one MLP configuration includes a fourth progressive award of a fourth progressive award level, that fourth progressive award of the fourth progressive award level is not associated with any other progressive awards of any other progressive award levels of any other MLP configurations.

In one embodiment, one or more of the progressive awards of an MLP configuration start at different levels and increment or increase until provided to a player (as described below). In one such embodiment, the different progressive awards of the different progressive award levels within an MLP configuration have different reset values and the different progressive awards of corresponding progressive award levels have the same reset value. In another such embodiment, the different progressive awards of the different progressive award levels within an MLP configuration have different reset values and different progressive awards of corresponding progressive award levels have different reset values.

In various embodiments, each of the progressive awards is associated with a progressive award contribution rate which represents the portion of each wager placed (or the portion of each designated wager, such as a maximum wager, placed) that is allocated to the progressive award. Continuing with the above example, for each of the three EGMs, a total of 2% of each wager placed (or 2% of each designated wager placed) is allocated to the three maintained progressive awards associated with that EGM, wherein this 2% is broken or divided up into a first progressive award contribution rate of 0.25% associated with the first maintained progressive award of the first progressive award level, a second progressive award contribution rate of 0.50% associated with the second maintained progressive award of the second progressive award level and a third progressive award contribution rate of 1.25% associated with the third maintained progressive award of the third progressive award level.

As seen in block 104 of FIG. 1, for each MLP configuration, the gaming system increments or grows one or more of the maintained progressive awards of that MLP configuration based on one or more of any wagers placed on any games associated with that MLP configuration. Building on the above-described example, for each $1.00 wagered on Gaming Machine A, the gaming system increments the first progressive award of the first progressive award level of the first MLP configuration by $0.0025 (i.e., $1.00×the first progressive award contribution rate of 0.025% associated with this first progressive award), the gaming system increments the second progressive award of the second progressive award level of the first MLP configuration by $0.005 (i.e., $1.00×the second progressive award contribution rate of 0.05% associated with this second progressive award), and the gaming system increments the third progressive award of the third progressive award level of the first MLP configuration by $0.0125 (i.e., $1.00×the third progressive award contribution rate of 1.25% associated with this third progressive award). In this example, based on these progressive award contribution rates, the first progressive award of the first progressive award level of the first MLP configuration (which is associated with the lowest start-up value) will increment or grow quicker than at least the third progressive award of the third progressive award level of the first MLP configuration (which is associated with the highest start-up value). It should be appreciated that different progressive awards of the same progressive award level of different MLP configurations may have the same or different contribution rates.

Figure 2B:
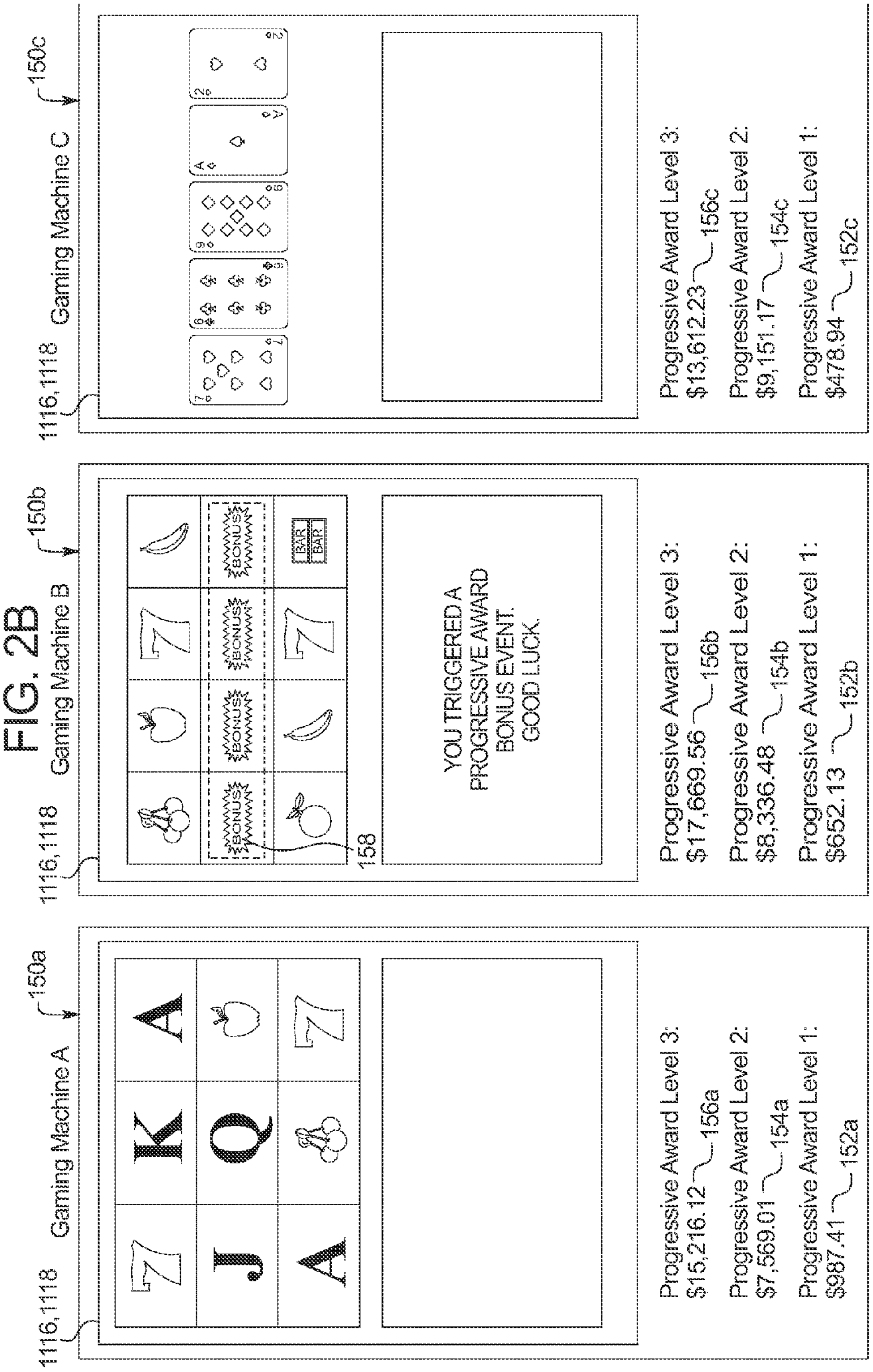

In addition to maintaining and incrementing the progressive awards of the different MLP configurations, the gaming system monitors for an occurrence of a progressive award triggering event associated with one of the MLP configurations as indicated in diamond 106. In one embodiment, a progressive award triggering event occurs based on a displayed event in a play of one or more displayed primary games. For example, as seen in FIG. 2B, based on the generation and display of a progressive award triggering symbol combination 158 in association with a play of a game of EGM 150*b*, the gaming system triggered a progressive award determination sequence for the MLP configuration of EGM 150*b*. In this example, the gaming system provides appropriate messages such as "YOU TRIGGERED A PROGRESSIVE AWARD BONUS EVENT" and "GOOD LUCK" to the player visually, or through suitable audio or audiovisual displays.

In another embodiment, the gaming system tracks the occurrences of one or more suitable events occurring at or in association with one or more players and/or one or more games and determines, based on these tracked events, whether a progressive award triggering event occurs. In another embodiment, the gaming system defines one or more game play parameters, wherein each time a player's tracked game play activity satisfies the defined parameter, a progressive award triggering event occurs. In another embodiment, a progressive award triggering event occurs independent of any displayed event in any play of any game.

If the gaming system determines that no progressive award triggering event has occurred in association with any of the MLP configurations, the gaming system returns to block 104 and continues to increment the progressive awards of the MLP configurations as described above.

On the other hand, if the gaming system determines that a progressive award triggering event has occurred in association with one of the MLP configurations, as indicated in block 108 of FIG. 1, the gaming system triggers a progressive award determination sequence in association with that MLP configuration. That is, for the multi-level progressive award configuration associated with the occurrence of the progressive award triggering event, the gaming system triggers a progressive award determination sequence. As described below, in one embodiment, the progressive award determination sequence includes one or more determinations which result in the selection of a progressive award (from the associated MLP configuration) to offer to the player.

Following the triggering of a progressive award determination sequence for an MLP configuration associated with the occurrence of the progressive award triggering event, as indicated in block 110 of FIG. 1, the gaming system determines one of the progressive awards of one of the progressive award levels of the MLP configuration. That is, for the multi-level progressive award configuration associated with the occurrence of the progressive award triggering event, the gaming system selects one of the progressive awards of one of the progressive award levels of that multi-level progressive award configuration.

In one embodiment, each of the progressive awards of the MLP configuration associated with the occurrence of the progressive award triggering event have the same probability of being selected. In another embodiment, at least two of the progressive awards of the MLP configuration associated with the occurrence of the progressive award triggering event have different probabilities of being selected. In another embodiment, each of the progressive awards of the MLP configuration associated with the occurrence of the progressive award triggering event have a different probability of being selected.

In one embodiment, the gaming system employs a weighted table to select which progressive award of the MLP configuration associated with the occurrence of the progressive award triggering event. In another embodiment, the gaming system employs one or more secondary games to select which progressive award of the MLP configuration associated with the occurrence of the progressive award triggering event. In one such embodiment, a secondary game includes a progressive award generator, such as a wheel with each of the different available progressive awards of the MLP configuration associated with the occurrence of the progressive award triggering event indicated in a different section of the wheel. In this embodiment, the progressive award generator spins and the progressive award indicated by an indicator determines which progressive award to select. In another such embodiment, a secondary game includes a progressive award reel with different symbol display positions associated with the different available progressive awards of the MLP configuration associated with the occurrence of the progressive award triggering event. In this embodiment, the progressive award reel spins and the progressive award associated with the symbol display position which aligns with a payline determines which progressive award to select. In another such embodiment, a secondary game includes a plurality of selections wherein each of the selections is associated with one of the progressive awards of the MLP configuration associated with the occurrence of the progressive award triggering event. In this embodiment, the gaming system enables the player to pick one or more selections wherein the gaming system determines which progressive award to offer to the player based on the player's picked selections. It should be appreciated that any suitable secondary game may be employed in association with determining which progressive award to select from the MLP configuration associated with the occurrence of the progressive award triggering event.

Figure 2C:
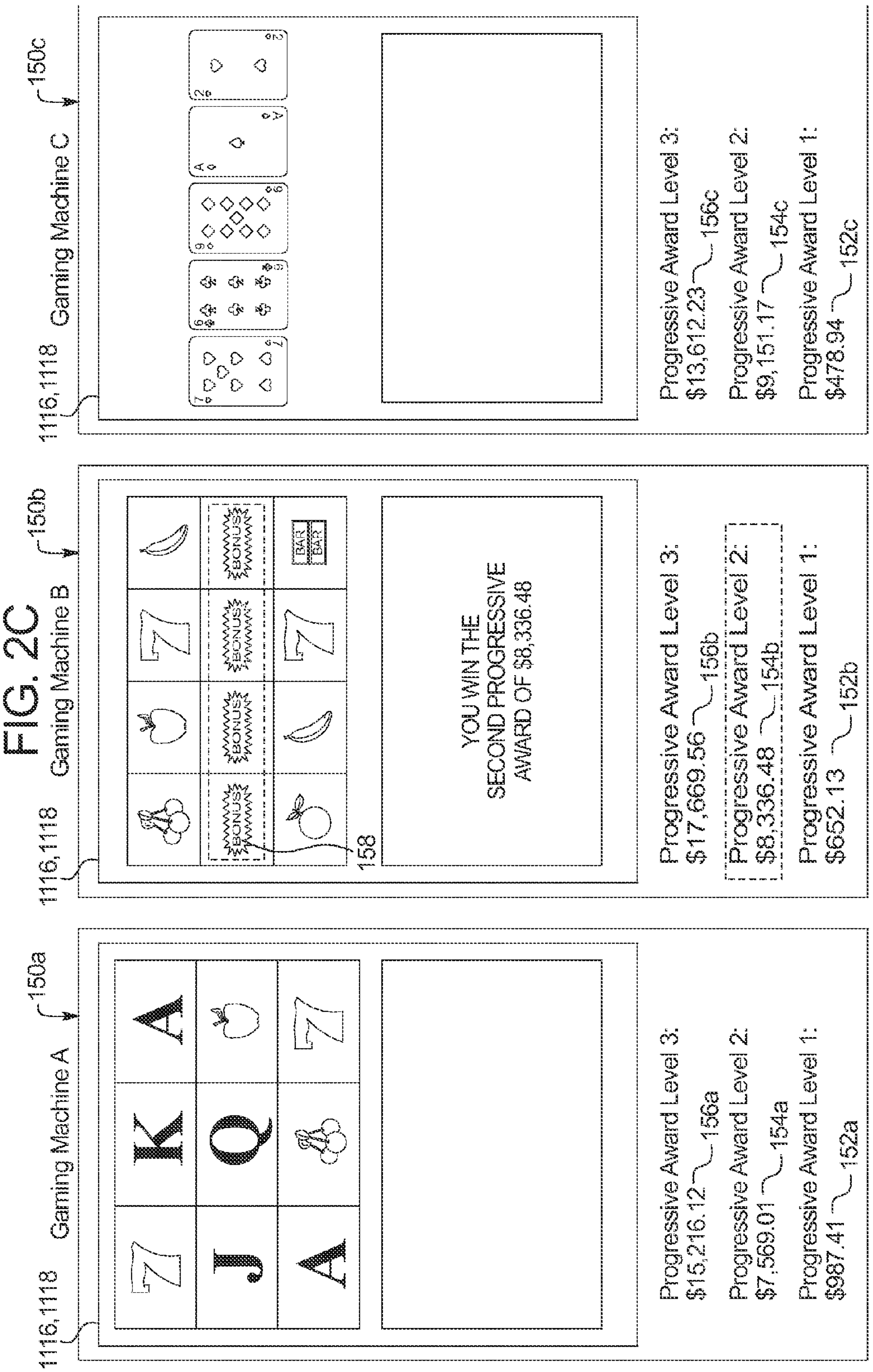

For example, as seen in FIG. 2C, for the occurrence of the progressive award triggering event associated with the second EGM 150*b*, the gaming system randomly selected the second progressive award of the second progressive award level 154*b* of the MLP configuration maintained in association with the second EGM 150*b*. In this example, the gaming system provides appropriate messages such as YOU WIN THE SECOND PROGRESSIVE AWARD OF $8,336.48" to the player visually, or through suitable audio or audiovisual displays.

Following the progressive award determination sequence and the determination of a progressive award level of the MLP configuration associated with the occurrence of the progressive award triggering event, the gaming system enables the player to accept or reject the determined progressive award as indicated in block 112 of FIG. 1. That is, the gaming system enables the player to keep the determined progressive award of a known value or discard the determined progressive award for another award of an unknown value, wherein the unknown value may be higher or lower than the known value of the determined progressive award.

Figure 2D:
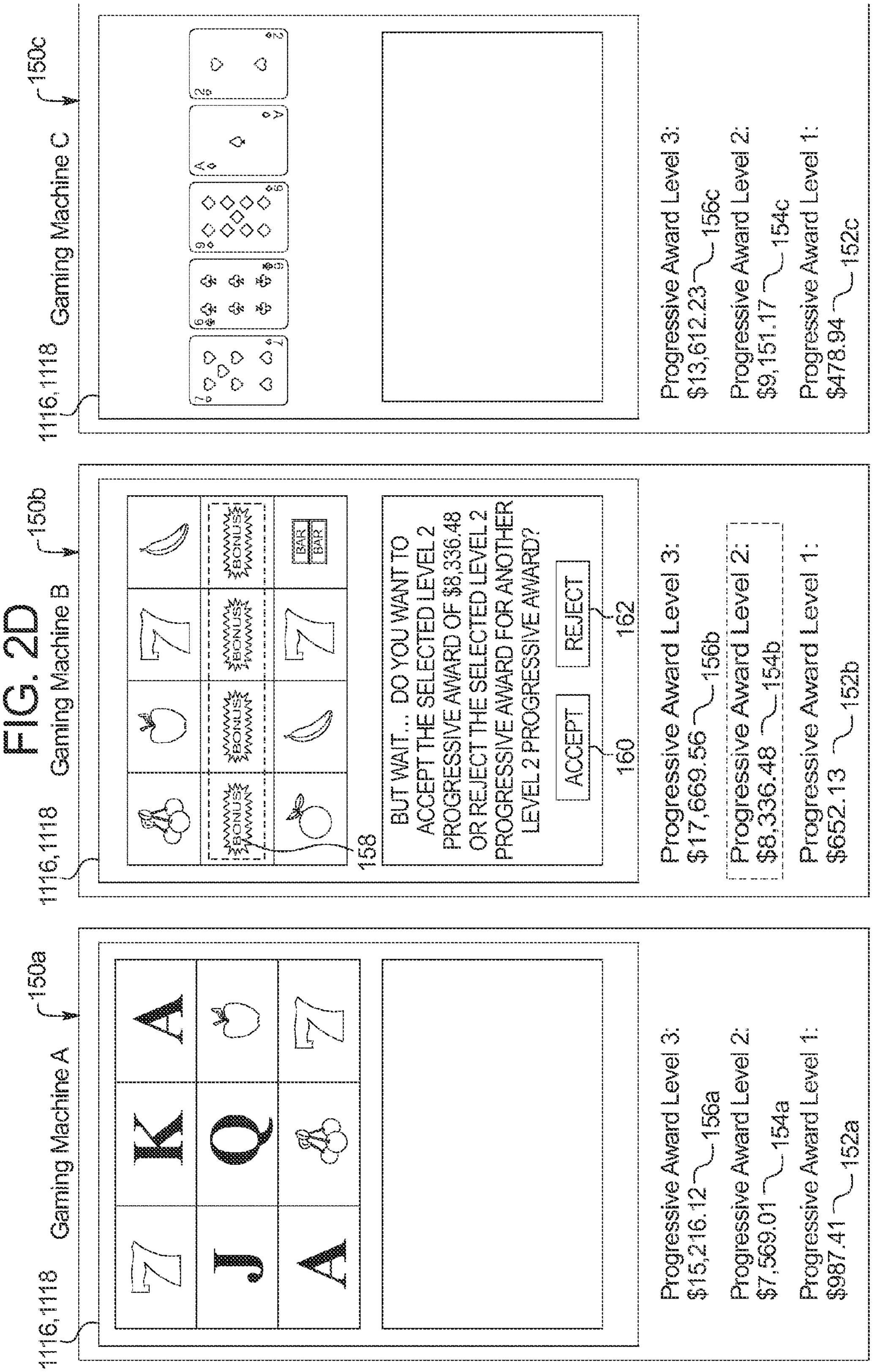

Continuing with the example above and as seen in FIG. 2D, following the selection of the second progressive award, the gaming system enables the player to keep the determined progressive award of $8,336.48 (utilizing the accept progressive award input 160) or reject the determined progressive award (utilizing the reject progressive award input 162) for another progressive award. In this example, the gaming system provides appropriate messages such as "BUT WAIT . . . " and "DO YOU WANT TO ACCEPT THE SELECTED LEVEL 2 PROGRESSIVE AWARD OF $8,336,48 OR REJECT THE SELECTED LEVEL 2 PROGRESSIVE AWARD FOR ANOTHER LEVEL 2 PROGRESSIVE AWARD?" to the player visually, or through suitable audio or audiovisual displays.

Returning to FIG. 1, if the gaming system determines that the player accepted the determined progressive award, the gaming system provides the accepted progressive award to the player as indicated in diamond 114 and block 116. The gaming system then resets the value of the determined progressive award as indicated in block 118 and returns to block 104 (to continue to increment the progressive awards of the MLP configurations). It should thus be appreciated that in these embodiments, if a player accepts the offered progressive award of an MLP configuration, the player forgoes an opportunity to potentially win a different progressive award of a different MLP configuration.

On the other hand, if the gaming system determines that the player rejected the determined progressive award, the gaming system triggers a progressive award replacement sequence as indicated in block 120.

For the triggered progressive award replacement sequence, as indicated in block 122, the gaming system determines one of the progressive awards of a progressive award level of another MLP configuration, wherein the progressive award level of the other MLP configuration is associated with or otherwise corresponds to the progressive award level of the rejected progressive award. In other words, the gaming system selects one of the progressive awards of the same progressive award level as the rejected progressive award and of a different MLP configuration. Put differently, if the player rejects a progressive award, the gaming system selects a replacement progressive award from the various progressive awards of comparable progressive award levels of the rejected progressive award. Accordingly, the gaming system disclosed herein enables the player to forfeit a progressive award of a progressive award level of one MLP configuration for another progressive award of a corresponding progressive award level of another MLP configuration.

In one embodiment, each of the progressive awards (of the corresponding progressive award level of the rejected progressive award) of the other MLP configurations have the same probability of being selected. In another embodiment, at least two of the progressive awards (of the corresponding progressive award level of the rejected progressive award) of the other MLP configurations have different probabilities of being selected. In another embodiment, each of the progressive awards (of the corresponding progressive award level of the rejected progressive award) of the other MLP configurations have a different probability of being selected.

In one embodiment, the gaming system employs a weighted table to select which progressive award (of the corresponding progressive award level of the rejected progressive award) of the other MLP configurations. In another embodiment, the gaming system employs one or more secondary games to select which progressive award (of the corresponding progressive award level of the rejected progressive award) of the other MLP configurations. In one such embodiment, a secondary game includes a progressive award generator, such as a wheel with each of the different available progressive awards (of the corresponding progressive award level of the rejected progressive award) of the other MLP configurations indicated in a different section of the wheel. In this embodiment, the progressive award generator spins and the progressive award indicated by an indicator determines which progressive award to select as a replacement progressive award. In another such embodiment, a secondary game includes a progressive award reel with different symbol display positions associated with the different available progressive awards (of the corresponding progressive award level of the rejected progressive award) of the other MLP configurations. In this embodiment, the progressive award reel spins and the progressive award associated with the symbol display position which aligns with a payline determines the replacement progressive award. In another such embodiment, a secondary game includes a plurality of selections wherein each of the selections is associated with one of the progressive awards (of the corresponding progressive award level of the rejected progressive award) of the other MLP configurations. In this embodiment, the gaming system enables the player to pick one or more selections wherein the gaming system determines which progressive award to select as the replacement progressive award based on the player's picked selections. In another such embodiment, a secondary game includes a game of skill wherein the value of the award corresponds to the player's performance as compared to a baseline performance level of the skill game. It should be appreciated that any suitable secondary game may be employed in association with determining which progressive award (of the corresponding progressive award level of the rejected progressive award) of the other MLP configurations to select as a replacement progressive award.

Figure 2E:
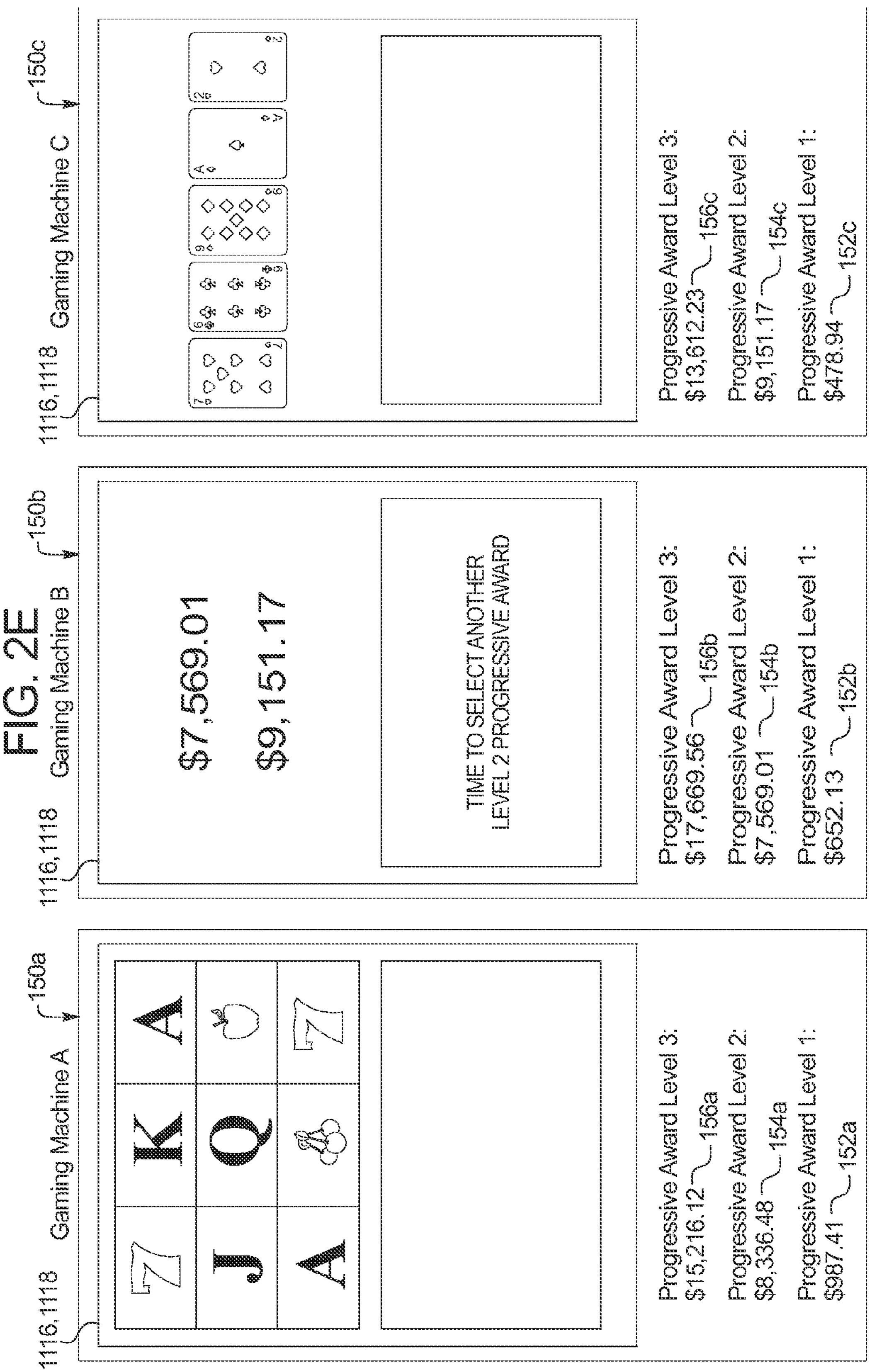

For example, as seen in FIG. 2E, following the player's rejection of the determined second level progressive award of $8,336.48, the gaming system triggers a progressive award replacement sequence wherein the gaming system selects a second level progressive award from the plurality of second level progressive awards of the plurality of maintained MLP configurations. Put differently, as each of the second level progressive awards of each of the MLP configurations correspond to or are otherwise associated with each other, the gaming system selects another progressive award of a corresponding progressive award level in association with the triggered progressive award replacement sequence. Specifically, the progressive award replacement sequence includes the gaming system selecting one of the second progressive award of the second progressive award level 154*a* of the MLP configuration associated with the first EGM 150*a*, and the second progressive award of the second progressive award level 154*c* of the MLP configuration associated with the third EGM 150*c* to determine a replacement progressive award. It should be appreciated that in this example, since the second progressive award of the second progressive award level 154*a* of the MLP configuration associated with the first EGM 150*a* currently has a value of $7,569.01 and the second progressive award of the second progressive award level 154*c* of the MLP configuration associated with the third EGM 150*c* currently has a value of $9,151,17, the replacement progressive award may be higher or lower than the rejected progressive award of $8,336.48. In this example, the gaming system provides appropriate messages such as TIME TO SELECT ANOTHER LEVEL 2 PROGRESSIVE AWARD' to the player visually, or through suitable audio or audiovisual displays.

Figure 2F:
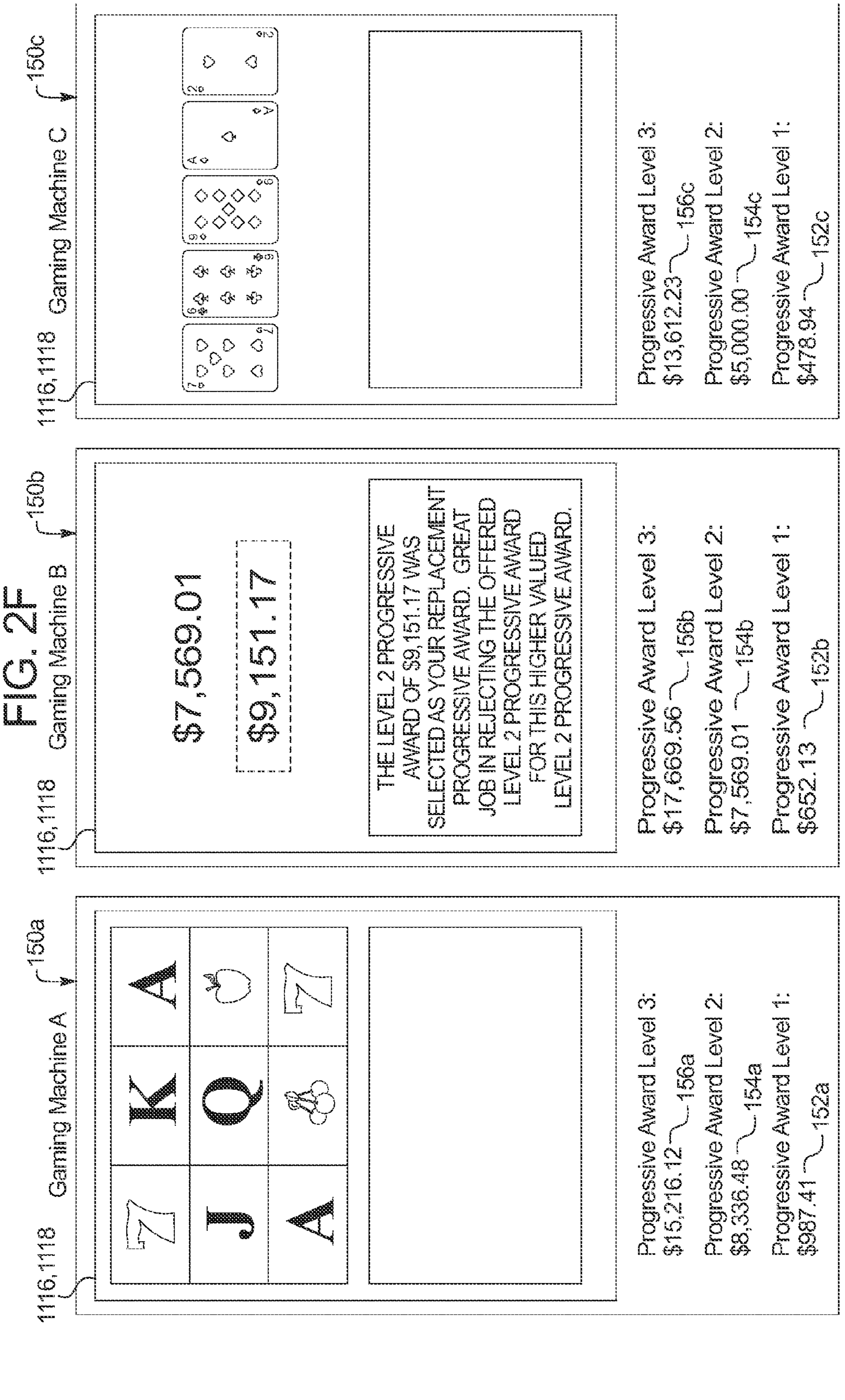

As seen in FIG. 2F, the gaming system selected the second progressive award of the second progressive award level 154*c* of the MLP configuration associated with the third EGM 150*c* as the replacement progressive award. In this example, the gaming system provides appropriate messages such as "THE LEVEL 2 PROGRESSIVE AWARD OF $9,151.17 WAS SELECTED AS YOUR REPLACEMENT PROGRESSIVE AWARD" and "GREAT JOB IN REJECTING THE OFFERED LEVEL 2 PROGRESSIVE AWARD FOR THIS HIGHER VALUED LEVEL 2 PROGRESSIVE AWARD" to the player visually, or through suitable audio or audiovisual displays.

Following the selection of a replacement progressive award of a corresponding progressive award level as the rejected progressive award, as indicated in block 124, the gaming system provides the replacement progressive award to the player. The gaming system then resets the value of one of the progressive awards of the corresponding progressive award level as indicated in block 126 and returns to block 104 (to continue to increment the progressive awards of the MLP configurations).

In one embodiment, the gaming system resets the value of the replacement progressive award. In this embodiment, the progressive award actually provided to the player is the progressive award which the gaming system resets to a reset value. For example, as seen in FIG. 2F, the gaming system resets the provided replacement second progressive award of the second progressive award level 154*c* of the MLP configuration associated with the third EGM 150*c* from the provided value of $9,151,17 to a reset value of $5,000.00. In another embodiment, the gaming system resets the value of the rejected progressive award. In this embodiment, despite the rejected progressive award not actually being provided to the player, since the gaming system selects the subsequently player rejected progressive award in association with the progressive award determination sequence, the gaming system resets this determined and subsequently rejected progressive award. It should be appreciated that in these embodiments, if at least two players simultaneously, concurrently or overlappingly trigger progressive award determination sequences, the gaming system either: (i) provides an incremented progressive award value to the first player and provides the reset progressive award value to the second player, or (ii) provides the incremented progressive award values to both the first player and the second player.

In one embodiment, as described above, in association with the progressive award replacement sequence, the gaming system selects a progressive award from a pool of corresponding progressive award levels (of the rejected progressive award) of different maintained MLP configurations. In this embodiment, the rejected progressive award is excluded from this pool of corresponding progressive awards of comparable progressive award levels of the rejected progressive award. In another embodiment, the rejected progressive award is included in this pool of corresponding progressive awards of comparable progressive award levels of the rejected progressive award. In this embodiment, the gaming system may select the rejected progressive award in association with the progressive award replacement sequence.

In one embodiment, in association with the progressive award replacement sequence, the gaming system selects a progressive award from a pool of corresponding progressive award levels (of the rejected progressive award) of a plurality of different maintained MLP configurations. In this embodiment, the different maintained MLP configurations are associated with different attributes or characteristics, such as different reset values and/or different progressive contribution rates. In another embodiment, in association with the progressive award replacement sequence, the gaming system selects a progressive award from a pool of corresponding progressive award levels (of the rejected progressive award) of a plurality of similarly maintained MLP configurations, such as a plurality of maintained MLP configurations associated with the same (or similar) attributes or characteristics, such as the same reset values and/or the same progressive contribution rates.

In one embodiment, as described above, the gaming system enables the player to reject the determined progressive award wherein the gaming system provides the determined replacement progressive award to the player. In another embodiment, the gaming system enables the player to reject the determined progressive award and further enables the player to reject the determined replacement progressive award. In this embodiment, if the player rejects the determined replacement progressive award, the gaming system triggers a further progressive award replacement sequence wherein the gaming system determines another progressive award of a comparable progressive award level of the initially rejected progressive award.

In one embodiment, the selection of one of the progressive awards of one of the progressive award levels of a multi-level progressive award configuration associated with the occurrence of the progressive award triggering event is based on the progressive award triggering event. For example, a play of a primary game that results in three scatter symbols is associated with a first level progressive award of an associated MLP configuration while a play of a primary game that results in four scatter symbols is associated with a second level progressive award of an associated MLP configuration. In one embodiment, the determination of whether to enable the player to accept or reject the determined progressive award is based on the progressive award triggering event. Continuing with the above example, a play of a primary game that results in three scatter symbols and a mystery symbol is associated with enabling the player to select to accept the first level progressive award of an associated MLP configuration or reject the first level progressive award of an associated MLP configuration for another first level progressive award of another MLP configuration.

In one embodiment, the gaming system displays the different progressive awards of one or more of the progressive award levels of one or more of the MLP configurations. In another embodiment, the gaming system displays the different progressive awards of each of the progressive award levels of each of the MLP configurations. In another embodiment, the gaming system displays the average different progressive awards of two or more of the progressive award levels of two or more of the MLP configurations. In another embodiment, the gaming system displays the average different progressive awards of each of the progressive award levels of each of the MLP configurations. In these embodiments, the gaming system displays such progressive award values (and/or such average progressive award values) before and/or after enabling the player to accept or reject the determined progressive award.

It should be appreciated that by displaying the different values of the different progressive awards of the various MLP configurations, the gaming system enables certain players to make an informed decision regarding whether to accept a determined progressive award or reject the determined progressive award and proceed to a progressive award replacement sequence for the determination of another progressive award (of a comparable progressive award level of the rejected progressive award).

For example, the gaming system determines to offer a player a $20.00 progressive award of a first progressive award level of a first MLP configuration, wherein the first progressive award levels of different MLP configurations are valued at $30.00, $10.22, $45.12, $5.23 and $18.29. In this example, a player may determine that the average expected payout of rejecting the $20.00 progressive award offer and proceeding to the progressive award replacement sequence is $21.77 (or ($30.00+$10.22+$45.12+$5.23+$18.29)/5). Accordingly, since an average expected payout of $21.77 (if the player proceeds to the progressive award replacement sequence) is greater than the offered progressive award of $20.00 (and specifically is associated with an average expected payout percentage or return to player of 108.8% (or $21.77/$20.00), the player of this example may opt to reject the offered progressive award of $20.00 and proceed to the progressive award replacement sequence. In another example, if the gaming system determines to offer a player the $30.00 progressive award of the first progressive award level of another MLP configuration, since an average expected payout of $19.77 (or ($20,00+$10.22+$45.12+$5,23+$18.29)/5) if the player proceeds to the progressive award replacement sequence is less than the offered progressive award of $30.00 (and specifically is associated with an average expected payout percentage or return to player of 65.9% (or $19.771$30.00), the player of this example may opt to keep the offered progressive award of $30.00 and not proceed to the progressive award replacement sequence.

In one embodiment, as mentioned above, each of the progressive awards of comparable progressive award levels have the same probability of being selected during a progressive award replacement sequence. In another embodiment, a plurality of the progressive awards of comparable progressive award levels have different probabilities of being selected during a progressive award replacement sequence. In one such embodiment, the gaming system modifies these probabilities to ensure that the average expected payout to the player remains the same (or within a designated range) regardless of whether the player accepts an offered progressive award or rejects the offered progressive award and proceeds to the progressive award replacement sequence.

In certain embodiments wherein the average expected payout to the player remains the same (or within a designated range) regardless of whether the player accepts an offered progressive award or rejects the offered progressive award and proceeds to the progressive award replacement sequence, if the offered progressive award is the highest valued progressive award of the progressive awards of comparable progressive award levels (or the lowest valued progressive award of the progressive awards of comparable progressive award levels), the gaming system adds one or more additional progressive awards to the pool of progressive awards of comparable progressive award levels. For example, if the gaming system determines to offer a player the $45.12 progressive award of the first progressive award level of an MLP configuration, since the $45.12 is the highest valued progressive award and the gaming system is configured such that the average expected payout to the player remains the same regardless of whether the player accepts an offered progressive award or rejects the offered progressive award and proceeds to the progressive award replacement sequence, the gaming system adds one or more progressive awards to the pool of progressive awards including progressive awards valued at $20.00, $30.00, $10.22, $45,12, $5.23, $18.29. That is, rather than setting the probability of the $45.12 progressive award at 100% and setting the probabilities of the remaining five progressive awards at 0% (to ensure that the $45.12 progressive award is selected and thus the average expected payout to the player remains at $45.12 regardless of whether the player accepts the offered progressive award of $45.12 or rejects the offered progressive award and proceeds to the progressive award replacement sequence), the gaming system adds one or more progressive awards valued greater than $45.12 to the pool of available progressive awards. In this example, after adding one or more progressive awards valued greater than $45.12 to the pool of available progressive awards, the gaming system proceeds with setting the probabilities of the different progressive awards in the pool such that the progressive award replacement sequence (when accounting for the different probabilities of the progressive awards of the pool of progressive awards) has an average expected payout of $45.12.

In different embodiments, one or more progressive award determination sequences and/or progressive award replacement sequences include, but are not limited to:

i. a play of any suitable slot game;
ii. a play of any suitable free spins or free game activations;
iii. a play of any suitable wheel game;
iv. a play of any suitable card game;
v. a play of any suitable offer and acceptance game;
vi. a play of any suitable award ladder game;
vii. a play of any suitable puzzle-type game;
viii. a play of any suitable persistence game;
ix. a play of any suitable selection game;
x. a play of any suitable cascading symbols game;
xi. a play of any suitable ways to win game:
xii. a play of any suitable scatter pay game;
xiii. a play of any suitable coin-pusher game;
xiv. a play of any suitable elimination game;
xv. a play of any suitable stacked wilds game;
xvi. a play of any suitable trail game;
xvii. a play of any suitable bingo game;
xviii. a play of any suitable video scratch-off game;
xix. a play of any suitable pick-until-complete game;
xx. a play of any suitable shooting simulation game;
xxi. a play of any suitable racing game;
xxii. a play of any suitable promotional game;
xxiii. a play of any suitable high-low game;
xxiv. a play of any suitable lottery game;
xxv. a play of any suitable number selection game;
xxvi. a play of any suitable dice game;
xxvii. a play of any suitable skill game;
xxviii. a play of any suitable auction game;
xxix. a play of any suitable reverse-auction game;
xxx. a play of any suitable group game;
xxxi. a play of any suitable game in a service window;
xxxii. a play of any suitable game on a mobile device; and/or
xxxiii. a play of any suitable game disclosed herein;

In different embodiments, one or more awards provided in association with one or more primary game plays, one or more secondary game plays, one or more progressive award determination sequences and/or one or more progressive award replacement sequences include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product such as a free teddy bear, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In one embodiment, the gaming system causes at least one display device of at least one electronic gaming machine to display any sequences associated with any MLP configurations. In another embodiment, in addition or in alternative to each electronic gaming machine displaying any sequences associated with any MLP configurations, the gaming system causes one or more community or overhead display devices to display part or all of any sequences associated with any MLP configurations to one or more other players or bystanders either at a gaming establishment or viewing over a network, such as the internet. In another embodiment, in addition or in alternative to each electronic gaming machine displaying any sequences associated with any MLP configurations, the gaming system causes one or more internet sites to each display any sequences associated with any MLP configurations such that a player is enabled to log on from a personal web browser. In another such embodiment, the gaming system enables the player to play one or more games on one device while viewing any sequences associated with any MLP configurations from another device, such as a desktop or laptop computer.

In different embodiments, a progressive award triggering event occurs based on an outcome associated with one or more plays of any primary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes such conditions to be satisfied and/or one or more of such events to occur.

In different embodiments, the gaming system does not provide any apparent reasons to the players for an occurrence of a progressive award triggering event. In these embodiments, such determinations are not triggered by an event in a primary game or based specifically on any of the plays of any primary games. That is, these events occur without any explanation or alternatively with simple explanations.

In one such embodiment, a progressive award triggering event occurs based on an amount of coin-in. In this embodiment, the gaming system determines if an amount of coin-in reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a progressive award triggering event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a progressive award triggering event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a progressive award triggering event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In different embodiments, a progressive award triggering event occurs based on a predefined variable reaching a defined parameter threshold. For example, when the 500,000$^{th}$ player has played an electronic gaming machine (ascertained from a player tracking system), one or more of such events or conditions occur. In different embodiments, the predefined parameter thresholds include a length of time, a length of time after a certain dollar amount is hit, a wager level threshold for a specific device (which electronic gaming machine is the first to contribute $250,000), a number of electronic gaming machines active, or any other parameter that defines a suitable threshold.

In different embodiments, a progressive award triggering event occurs based on a quantity of games played. In this embodiment, a quantity of games played is set for when one or more of such events or conditions will occur. In one embodiment, such a set quantity of games played is based on historic data.

In different embodiments, a progressive award triggering event occurs based on time. In this embodiment, a time is set for when one or more of such events or conditions will occur. In one embodiment, such a set time is based on historic data.

In different embodiments, a progressive award triggering event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the electronic gaming machine. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments, a progressive award triggering event occurs based on a system determination, including one or more random selections by the central controller. In one embodiment, as described above, the gaming system tracks all active electronic gaming machines and the wagers they placed. In one such embodiment, based on the electronic gaming machine's state as well as one or more wager pools associated with the electronic gaming machine, the gaming system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a progressive award triggering event occurs based on a determination of if any numbers allotted to an electronic gaming machine match a randomly selected number. In this embodiment, upon or prior to each play of each electronic gaming machine, an electronic gaming machine selects a random number from a range of numbers and during each primary game, the electronic gaming machine allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a progressive award triggering event to occur may be implemented in accordance with the gaming system and method disclosed herein.

It should be appreciated that one or more of the above-described triggers pertaining to a progressive award triggering event occurring may be combined in one or more different embodiments.

Alternative Embodiments

It should be appreciated that in different embodiments, one or more of:

i. a quantity of multi-level progressive award configurations;
ii. a quantity of progressive award levels of one or more MLP configurations;
iii. one or more reset values of one or more progressive awards;
iv. one or more contribution rates of one or more progressive awards;
v. which progressive award levels of which MLP configurations are associated with each other;
vi. which progressive award levels of which MLP configurations are not associated with each other;
vii. when a progressive award triggering event occurs;
viii. a type of progressive award determination sequence to trigger;
ix. which progressive award level of an MLP configuration to select;
x. a probability of one or more progressive awards of an MLP configuration being selected;
xi. whether to enable a player to accept or reject a selected progressive award;
xii. which type of progressive award replacement sequence to trigger;
xiii. whether to enable a player to accept or reject a replacement progressive award;
xiv. a quantity of replacement progressive awards a player may reject;
xv. a probability of one or more replacement progressive awards being selected;
xvi. whether to reset a rejected progressive award or a replacement progressive award to a reset value; and/or
xvii. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
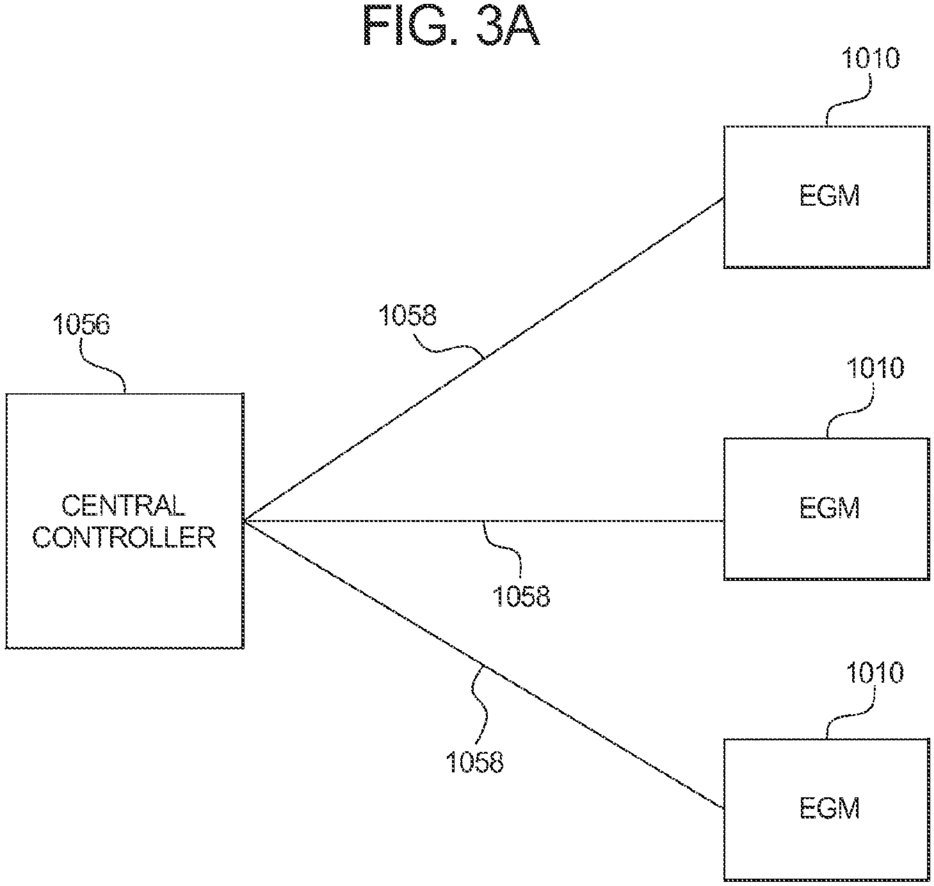
FIG. 3A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link, in certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an Internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
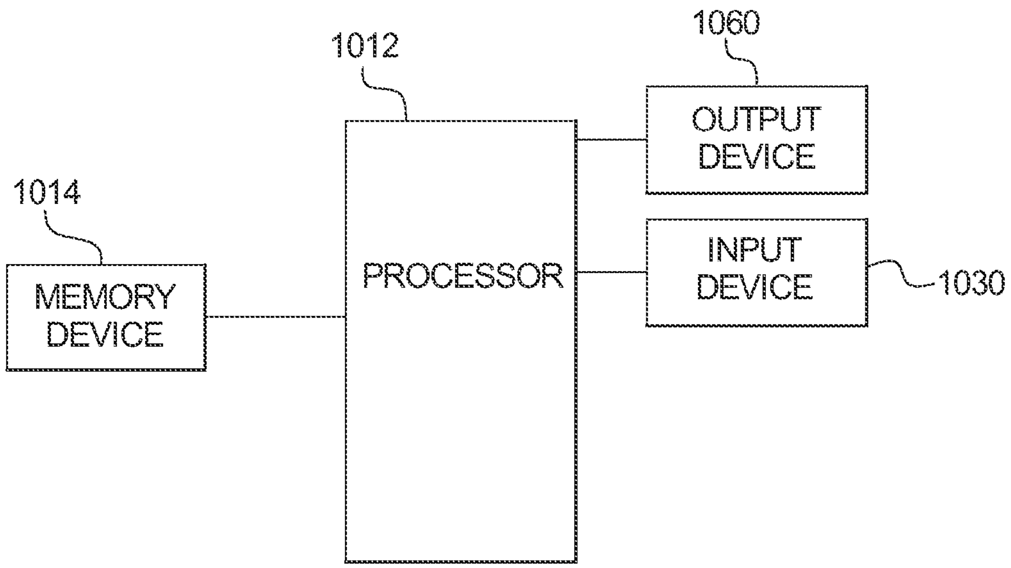
FIG. 3B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
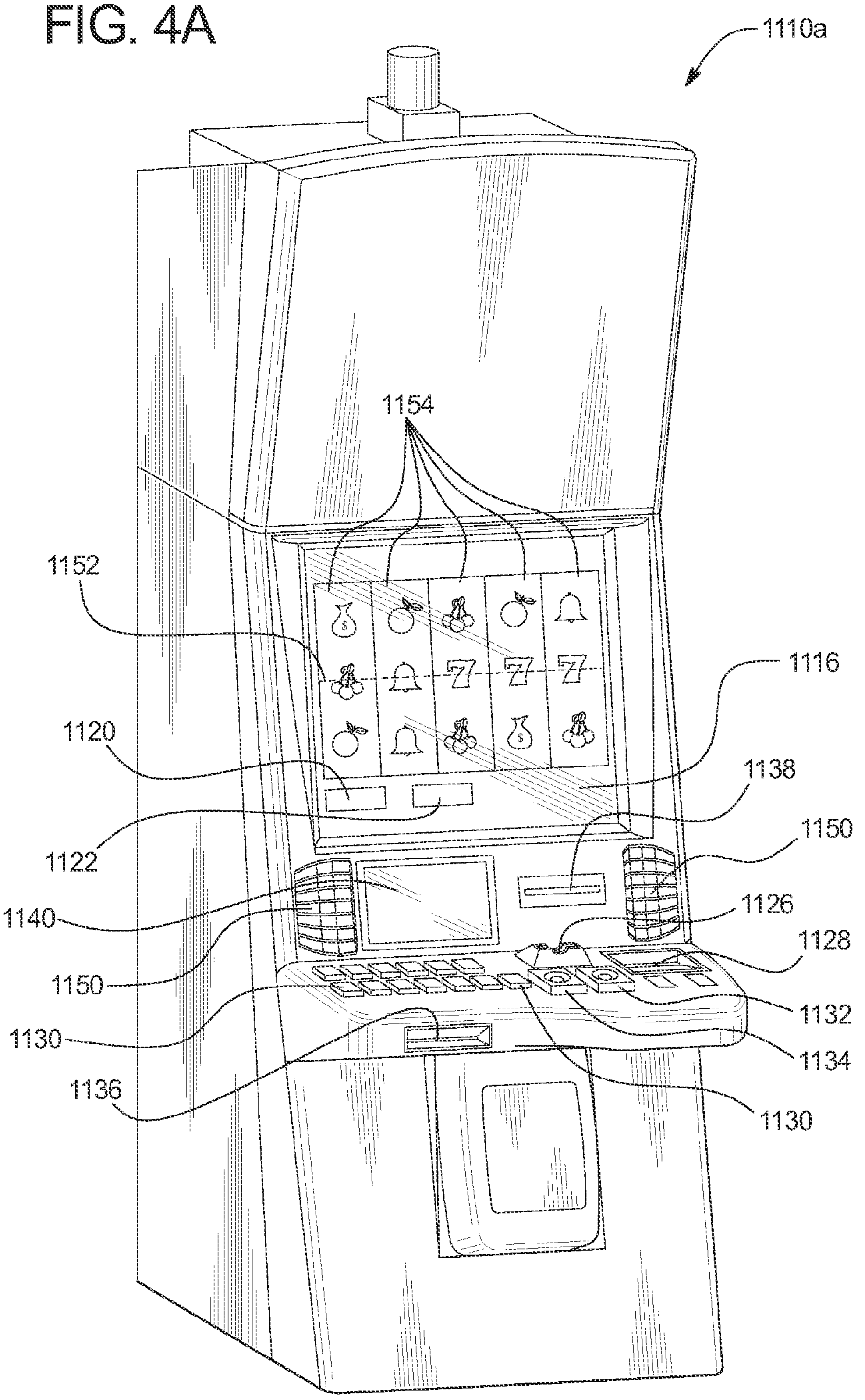
FIGS. 4A and 4B are perspective views of example alternative embodiments of the gaming system disclosed herein.
Figure 4B:
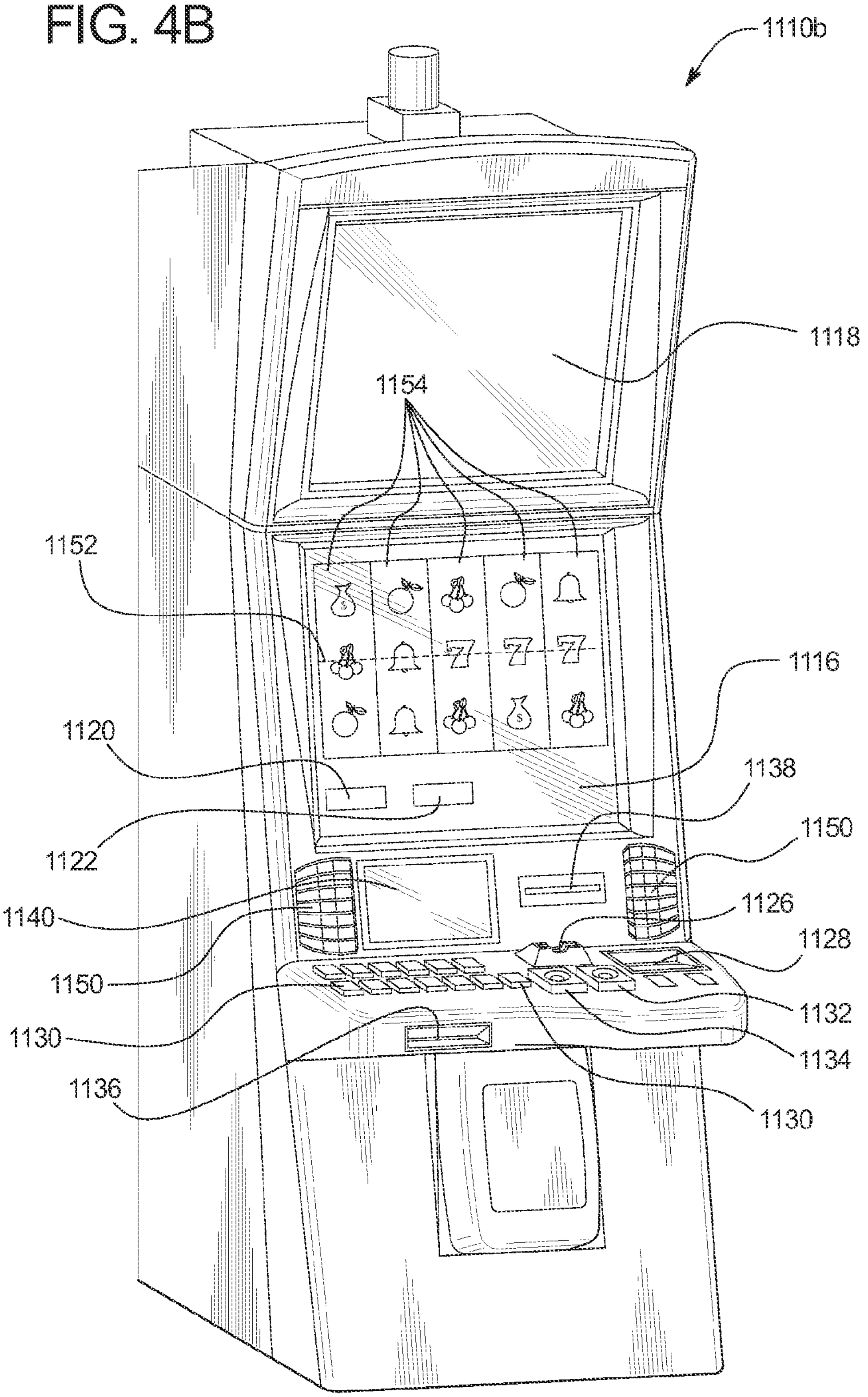

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281561 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1156. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611.411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
- a housing;
- at least one display device supported by the housing;
- a plurality of input devices supported by the housing, said plurality of input devices including:
  - (i) an acceptor, and
  - (ii) a cashout device;
- at least one processor; and
- at least one memory device which stores a plurality of instructions, which when executed by the at least one processor, cause the at least one processor to operate with the display device and the plurality of input devices to:
  - (a) if a physical item is received via the acceptor, establish a credit balance based, at least in part, on a monetary value associated with the received physical item,
  - (b) maintain a plurality of multi-level progressive award configurations, each multi-level progressive award configuration including a plurality of progressive awards of a plurality of progressive award levels, wherein each progressive award is associated with at least another one of the progressive awards of the same progressive award level of another one of the multi-level progressive award configurations,
  - (c) if a progressive award triggering event occurs in association with one of the multi-level progressive award configurations:
    - (i) select one of the plurality of progressive awards of one of the plurality of progressive award levels of the multi-level progressive award configuration associated with the occurrence of the progressive award triggering event,
    - (ii) enable a player to accept or reject the selected progressive award,
    - (iii) if the player accepts the selected progressive award:
      - (A) display the selected progressive award, and
      - (B) provide the selected progressive award to the player, and
    - (iv) if the player rejects the selected progressive award:
      - (A) select a replacement progressive award, said replacement progressive award being selected from the associated progressive awards of the same progressive award level of the rejected progressive award, and
      - (B) display the selected replacement progressive award; and
  - (d) if a cashout input is received via the cashout device, cause an initiation of any payout associated with the credit balance.

2. The gaming system of claim 1, wherein each progressive award is associated with each of the progressive awards of the same progressive award level of each of the multi-level progressive award configurations.

3. The gaming system of claim 1, wherein when executed by the at least one processor if the player rejects the selected progressive award, the plurality of instructions cause the at least one processor to provide the replacement progressive award to the player.

4. The gaming system of claim 1, wherein when executed by the at least one processor if the player rejects the selected progressive award, the plurality of instructions cause the at least one processor to:
- (i) enable the player to accept or reject the replacement progressive award,
- (iii) if the player accepts the replacement progressive award, provide the replacement progressive award to the player, and
- (iv) if the player rejects the replacement progressive award, select another replacement progressive award, said other replacement progressive award being selected from the associated progressive awards of the same progressive award level of the rejected progressive award.

5. The gaming system of claim 1, wherein when executed by the at least one processor if the player rejects the selected progressive award, the plurality of instructions cause the at least one processor to reset one of the progressive awards selected from the group consisting of: the selected progressive award and the replacement progressive award.

6. The gaming system of claim 1, wherein when executed by the at least one processor, the plurality of instructions cause the at least one processor to select one of the plurality of progressive awards of one of the plurality of progressive award levels of the multi-level progressive award configuration in association with a displayed progressive award determination sequence.

7. The gaming system of claim 1, wherein when executed by the at least one processor, the plurality of instructions cause the at least one processor to select the replacement progressive award in association with a displayed progressive award replacement sequence.

8. The gaming system of claim 1, wherein a determination that the progressive award triggering event will occur is independent of any occurrence in any play of any displayed games.

9. The gaming system of claim 1, wherein at least two of the associated progressive awards of the same progressive award level of the rejected progressive award have different probabilities of being selected as the replacement progressive award.

10. The gaming system of claim 1, wherein at least one of any progressive awards include at least one selected from the group consisting of: a quantity of monetary credits, a quantity of non-monetary credits, a quantity of promotional credits, a quantity of player tracking points, a quantity of free plays of a game, and a quantity of plays of at least one non-wagering game.

11. A gaming system server comprising:

at least one processor; and at least one memory device which stores a plurality of instructions, which when executed by the at least one processor, cause the at least one processor to:

(a) maintain a plurality of multi-level progressive award configurations, each multi-level progressive award configuration including a plurality of progressive awards of a plurality of progressive award levels, wherein each progressive award is associated with at least another one of the progressive awards of the same progressive award level of another one of the multi-level progressive award configurations, and (b) if a progressive award triggering event occurs in association with one of the multi-level progressive award configurations:

(i) select one of the plurality of progressive awards of one of the plurality of progressive award levels of the multi-level progressive award configuration associated with the occurrence of the progressive award triggering event, (ii) enable a player to accept or reject the selected progressive award, (iii) if the player accepts the selected progressive award:

(A) cause at least one display device to display the selected progressive award, and (B) provide the selected progressive award to the player, wherein a credit balance is increasable based on the provided progressive award, said credit balance being: (I) increasable via an acceptor of a physical item associated with a monetary value, and (II) decreasable via a cash-out device, and (iv) if the player rejects the selected progressive award:

(A) select a replacement progressive award, said replacement progressive award being selected from the associated progressive awards of the same progressive award level of the rejected progressive award, and (B) cause the at least one display device to display the selected replacement progressive award.

12. The gaming system server of claim 11, wherein each progressive award is associated with each of the progressive awards of the same progressive award level of each of the multi-level progressive award configurations.

13. The gaming system server of claim 11, wherein when executed by the at least one processor if the player rejects the selected progressive award, the plurality of instructions cause the at least one processor to provide the replacement progressive award to the player.

14. The gaming system server of claim 11, wherein when executed by the at least one processor if the player rejects the selected progressive award, the plurality of instructions cause the at least one processor to:

(i) enable the player to accept or reject the replacement progressive award, (iii) if the player accepts the replacement progressive award, provide the replacement progressive award to the player, and (iv) if the player rejects the replacement progressive award, select another replacement progressive award, said other replacement progressive award being selected from the associated progressive awards of the same progressive award level of the rejected progressive award.

15. The gaming system server of claim 11, wherein when executed by the at least one processor if the player rejects the selected progressive award, the plurality of instructions cause the at least one processor to reset one of the progressive awards selected from the group consisting of: the selected progressive award and the replacement progressive award.

16. The gaming system server of claim 11, wherein when executed by the at least one processor, the plurality of instructions cause the at least one processor to select one of the plurality of progressive awards of one of the plurality of progressive award levels of the multi-level progressive award configuration in association with a displayed progressive award determination sequence.

17. The gaming system server of claim 11, wherein when executed by the at least one processor, the plurality of instructions cause the at least one processor to select the replacement progressive award in association with a displayed progressive award replacement sequence.

18. The gaming system server of claim 11, wherein a determination that the progressive award triggering event will occur is independent of any occurrence in any play of any displayed games.

19. The gaming system server of claim 11, wherein at least two of the associated progressive awards of the same progressive award level of the rejected progressive award have different probabilities of being selected as the replacement progressive award.

20. The gaming system server of claim 11, wherein at least one of any progressive awards include at least one selected from the group consisting of: a quantity of monetary credits, a quantity of non-monetary credits, a quantity of promotional credits, a quantity of player tracking points, a quantity of free plays of a game, and a quantity of plays of at least one non-wagering game.

21. A method of operating a gaming system, said method comprising:

(a) causing at least one processor to execute a plurality of instructions to maintain a plurality of multi-level progressive award configurations, each multi-level progressive award configuration including a plurality of progressive awards of a plurality of progressive award levels, wherein each progressive award is associated with at least another one of the progressive awards of the same progressive award level of another one of the multi-level progressive award configurations, and (b) if a progressive award triggering event occurs in association with one of the multi-level progressive award configurations:

(i) causing the at least one processor to execute the plurality of instructions to select one of the plurality of progressive awards of one of the plurality of progressive award levels of the multi-level progressive award configuration associated with the occurrence of the progressive award triggering event, (ii) enabling a player to accept or reject the selected progressive award, (iii) if the player accepts the selected progressive award:

(A) causing at least one display device to display the selected progressive award, and (B) providing the selected progressive award to the player, wherein a credit balance is increasable based on the provided progressive award, said credit balance being: (I) increasable via an acceptor of a physical item associated with a monetary value, and (II) decreasable via a cashout device, and (iv) if the player rejects the selected progressive award:

(A) causing the at least one processor to execute the plurality of instructions to select a replacement progressive award, said replacement progressive award being selected from the associated progressive awards of the same progressive award level of the rejected progressive award, and (B) causing the at least one display device to display the selected replacement progressive award.

22. The method of claim 21, wherein each progressive award is associated with each of the progressive awards of the same progressive award level of each of the multi-level progressive award configurations.

23. The method of claim 21, which includes, if the player rejects the selected progressive award, providing the replacement progressive award to the player.

24. The method of claim 21, which includes, if the player rejects the selected progressive award:

(i) enabling the player to accept or reject the replacement progressive award, (iii) if the player accepts the replacement progressive award, providing the replacement progressive award to the player, and (iv) if the player rejects the replacement progressive award, causing the at least one processor to execute the plurality of instructions to select another replacement progressive award, said other replacement progressive award being selected from the associated progressive awards of the same progressive award level of the rejected progressive award.

25. The method of claim 21, which includes, if the player rejects the selected progressive award, causing the at least one processor to execute the plurality of instructions to reset one of the progressive awards selected from the group consisting of: the selected progressive award and the replacement progressive award.

26. The method of claim 21, which includes causing the at least one processor to execute the plurality of instructions to select one of the plurality of progressive awards of one of the plurality of progressive award levels of the multi-level progressive award configuration in association with a displayed progressive award determination sequence.

27. The method of claim 21, which includes causing the at least one processor to execute the plurality of instructions to select the replacement progressive award in association with a displayed progressive award replacement sequence.

28. The method of claim 21, wherein a determination that the progressive award triggering event will occur is independent of any occurrence in any play of any displayed games.

29. The method of claim 21, wherein at least two of the associated progressive awards of the same progressive award level of the rejected progressive award have different probabilities of being selected as the replacement progressive award.

30. The method of claim 21, wherein at least one of any progressive awards include at least one selected from the group consisting of: a quantity of monetary credits, a quantity of non-monetary credits, a quantity of promotional credits, a quantity of player tracking points, a quantity of free plays of a game, and a quantity of plays of at least one non-wagering game.

31. The method of claim 21, which is provided through a data network.

32. The method of claim 31, wherein the data network is an internet.

* * * * *